US008064768B2

(12) United States Patent
Ji et al.

(10) Patent No.: US 8,064,768 B2
(45) Date of Patent: Nov. 22, 2011

(54) INTRA-CHANNEL EQUALIZING OPTICAL INTERLEAVER

(75) Inventors: Philip Nan Ji, Princeton, NJ (US); Lei Xu, Princeton, NJ (US); Ting Wang, West Windsor, NJ (US); Shuji Murakami, Tokyo (JP); Tsutomu Tajima, Tokyo (JP); Yutaka Yano, Tokyo (JP)

(73) Assignees: NEC Laboratories America, Inc., Princeton, NJ (US); NEC Corporation, Tokyo (JP)

( * ) Notice: Subject to any disclaimer, the term of this patent is extended or adjusted under 35 U.S.C. 154(b) by 846 days.

(21) Appl. No.: 12/128,748

(22) Filed: May 29, 2008

(65) Prior Publication Data

US 2009/0162066 A1 Jun. 25, 2009

Related U.S. Application Data

(60) Provisional application No. 61/014,891, filed on Dec. 19, 2007.

(51) Int. Cl.
*H04J 14/02* (2006.01)

(52) U.S. Cl. ............................. 398/80; 398/79; 398/82

(58) Field of Classification Search .................. None
See application file for complete search history.

(56) References Cited

U.S. PATENT DOCUMENTS

| | | | | |
|---|---|---|---|---|
| 4,782,492 A * | 11/1988 | McMahon et al. | ............... | 372/34 |
| 5,101,450 A * | 3/1992 | Olshansky | ........................ | 385/3 |
| 5,936,494 A * | 8/1999 | Pollock | ......................... | 333/252 |
| 5,991,477 A * | 11/1999 | Ishikawa et al. | ................ | 385/24 |
| 6,122,423 A * | 9/2000 | You et al. | ........................ | 385/49 |
| 6,519,065 B1 * | 2/2003 | Colbourne et al. | ............. | 398/81 |
| 6,636,666 B2 * | 10/2003 | Chan et al. | ........................ | 385/37 |
| 6,768,874 B1 * | 7/2004 | Colbourne et al. | ............. | 398/147 |
| 6,909,531 B2 * | 6/2005 | Frignac et al. | ................ | 359/279 |
| 6,965,479 B2 * | 11/2005 | Sano et al. | ..................... | 359/634 |
| 7,019,901 B2 * | 3/2006 | Kawahata | ................ | 359/489.06 |
| 7,146,079 B2 * | 12/2006 | Nara et al. | ....................... | 385/39 |
| 7,257,334 B1 * | 8/2007 | Weitzel | ......................... | 398/212 |
| 7,277,647 B2 * | 10/2007 | Gill et al. | ....................... | 398/188 |
| 7,280,722 B2 * | 10/2007 | Temkin et al. | .................... | 385/37 |
| 7,308,169 B2 * | 12/2007 | Chandrasekhar et al. | ....... | 385/27 |
| 7,327,956 B2 * | 2/2008 | Doerr et al. | ..................... | 398/81 |
| 7,397,986 B2 * | 7/2008 | Bulthuis et al. | ................. | 385/37 |
| 7,408,713 B1 * | 8/2008 | Hsieh et al. | .................... | 359/577 |
| 7,411,725 B2 * | 8/2008 | Suzuki et al. | .................. | 359/325 |
| 7,414,728 B2 * | 8/2008 | Caplan | ........................... | 356/477 |
| 7,463,681 B2 * | 12/2008 | Garg et al. | ..................... | 375/233 |

(Continued)

*Primary Examiner* — Shi K Li
*Assistant Examiner* — Rajsheed Black-Childress
(74) *Attorney, Agent, or Firm* — Joseph Kolodka

(57) ABSTRACT

An apparatus includes an interleaver configuration for at least one of combining or separating odd and even channel groups to achieve channel density doubling; and an optical equalizer for suppressing inter symbol interference within the channels to provide intra-channel equalizing in the optical path, the equalizer being integrated into the interleaver. Preferably, optical equalizer and interleaver are integrated together as a single monolithic device, the optical equalizer includes a passband that has a dip in the channel center to achieve a raised-cosine filtering profile in the optical signal path to achieve inter-symbol interference ISI suppression, and the equalizer includes integration into the optical path of the interleaver to realize a monolithic device combining or separating odd and even channel groups to achieve channel density doubling. Preferably, also, the optical equalizer includes a first equalizer with half the depth of required ripple dips at both a first output port and an input port and a second equalizer with half the depth of required ripple dips at a second output port.

10 Claims, 3 Drawing Sheets

U.S. PATENT DOCUMENTS

| | | | |
|---|---|---|---|
| 7,526,210 B2 * | 4/2009 | Liu | 398/188 |
| 7,546,041 B2 * | 6/2009 | Griffin | 398/188 |
| 7,573,641 B2 * | 8/2009 | Hsieh | 359/637 |
| 7,630,650 B2 * | 12/2009 | Hoshida et al. | 398/183 |
| 7,660,534 B2 * | 2/2010 | Al-Chalabi | 398/171 |
| 2001/0040681 A1 * | 11/2001 | Paiam et al. | 356/480 |
| 2002/0171908 A1 * | 11/2002 | Copner et al. | 359/278 |
| 2003/0007718 A1 * | 1/2003 | Bazylenko | 385/14 |
| 2003/0012250 A1 * | 1/2003 | Shirasaki | 372/98 |
| 2003/0133650 A1 * | 7/2003 | Hakimi et al. | 385/27 |
| 2003/0223673 A1 * | 12/2003 | Garito et al. | 385/14 |
| 2004/0184819 A1 * | 9/2004 | Vassilieva et al. | 398/188 |
| 2004/0228564 A1 * | 11/2004 | Gunn et al. | 385/1 |
| 2005/0041731 A1 * | 2/2005 | Azizi | 375/229 |
| 2006/0034614 A1 * | 2/2006 | Chen et al. | 398/149 |
| 2006/0067695 A1 * | 3/2006 | Doerr et al. | 398/85 |
| 2006/0067699 A1 * | 3/2006 | Chandrasekhar et al. | 398/147 |
| 2006/0232848 A1 * | 10/2006 | Xu et al. | 359/325 |
| 2007/0116468 A1 * | 5/2007 | Ji et al. | 398/79 |
| 2007/0196110 A1 * | 8/2007 | Mikkelsen et al. | 398/140 |
| 2007/0206898 A1 * | 9/2007 | Wang et al. | 385/24 |
| 2008/0138014 A1 * | 6/2008 | Chang et al. | 385/45 |
| 2008/0199189 A1 * | 8/2008 | Xu et al. | 398/188 |
| 2008/0226306 A1 * | 9/2008 | Heffner et al. | 398/202 |
| 2008/0240736 A1 * | 10/2008 | Ji et al. | 398/202 |
| 2009/0016739 A1 * | 1/2009 | Yu et al. | 398/158 |
| 2009/0116851 A1 * | 5/2009 | Heffner et al. | 398/208 |
| 2009/0162066 A1 * | 6/2009 | Ji et al. | 398/79 |
| 2009/0245814 A1 * | 10/2009 | Griffin | 398/188 |
| 2010/0232789 A1 * | 9/2010 | Ji et al. | 398/25 |
| 2010/0232803 A1 * | 9/2010 | Ji et al. | 398/149 |

* cited by examiner

INTRA-CHANNEL EQUALIZING OPTICAL INTERLEAVER

This application claims the benefit of U.S. Provisional Application No. 61/014,891, filed Dec. 19, 2007, which is incorporated herein by reference.

BACKGROUND OF THE INVENTION

The present invention relates generally to optical communications and, more particularly, to an intra-channel equalizing optical filter for dense wavelength-division multiplexing (DWDM) communications.

Global communication network traffic has been growing exponentially in recent years, mainly driven by the expansion of Internet and volume of new data services which include online video sharing services, such as YouTube, high-definition digital TV, and enterprise storage area network (SAN). As the backbone to provide the transportation pipelines for such traffic volumes, the optical network has received demands for larger bandwidth capacity. The 40 Giga-bit-per-second (Gbps) network is being deployed by network companies worldwide, and the 100 Gbps network has been a hot topic in both telecom and datacom industries in the past year.

In the US, two major telecommunication carriers, Verizon and AT&T, have announced plans to deploy 100 Gbps per channel DWDM service in 2009 and 2010 respectively. IEEE has also formed a high-speed study group (HSSG) to develop the standard for 100 Gb Ethernet. Some carriers are considering bypassing a 40 Gbps stage and upgrading their network from existing 10 Gbps to 100 Gbps. Even higher data rates are also being considered. For example, ITU-T's Study Group (SG) 15 is currently developing the specifications for new optical data unit (ODU) and optical transport unit (OUT) standards. The proposed ODU4/OTU4 rate ranges from 112 Gbps to 174 Gbps.

As channel data rate increases and signal spectrum broadens, the optical signal experiences more physical impairments during transmission, such as chromatic dispersion (CD), polarization mode dispersion (PMD) and fiber nonlinear effects. Another physical impairment is the inter-symbol interference (ISI), which is caused by the spectrum narrowing due to filtering effect from passive optical elements in the transmission path (such as multiplexer, demultiplexer and interleaver). The filtering effect is even more significant at high data rate and narrow channel spacing. For 100 Gbps signal, even with advanced modulation formats and technologies that offer high spectrum efficiency (such as DQPSK, 8PSK, and polarization multiplexing), the signal spectral per channel is still wider than existing 10 Gbps signal, so the ISI cannot be ignored.

There are several existing approaches to mitigate the ISI caused by the filtering effect in DWDM optical transmission system. One technique uses modulation schemes with better spectral efficiency. However, as the data rate increases further, the signal spectrum still grows broader. Another technique uses advanced coding, which is still technically challenging or very expensive at high speed). A different technique uses side band pre-filtering to reduce signal spectral width, which increases system complexity and compromises performance. A further technique uses electronic post-detection processing to equalize the signal, but the high speed electronic is either very expensive or not yet achievable. A yet further technique uses intra-channel optical equalization, but it requires an additional optical component, leading to higher cost, larger footprint and higher optical loss.

Accordingly, there is a need for an improved intra-channel optical equalizing interleaver that suppresses inter-symbol interference ISI caused by the filtering effect to improve the transmission performance of a DWDM signal.

SUMMARY OF THE INVENTION

In accordance with the invention, an apparatus includes an interleaver configuration for combining or separating odd and even channel groups to achieve channel density doubling; and an optical equalizer for suppressing inter symbol interference within the channels to provide intra-channel equalizing in the optical path, the equalizer being integrated into the interleaver. Preferably, optical equalizer and interleaver are integrated together as a single monolithic device, the optical equalizer includes a passband that has a dip in the channel center to achieve a raised-cosine filtering profile in the optical signal path to achieve inter-symbol interference ISI suppression, and the equalizer includes integration into the optical path of the interleaver to realize a monolithic device combining or separating odd and even channel groups to achieve channel density doubling. Preferably, also, the optical equalizer includes a first equalizer with half the depth of required ripple dips at both a first output port and an input port and a second equalizer with half the depth of required ripple dips at a second output port.

In accordance with another aspect of the invention, a method includes the steps of combining or separating odd and even channel groups to achieve channel density doubling; suppressing inter-symbol interference within the channels in the optical path to provide intra-channel equalizing, and integrating the channel group combining or separating, and suppressing of inter-symbol interfere into a single device. Preferably, the integrating step includes combining both functions with bulk optic device structure and configuring a first optical equalizer with half depth in an optical path of an input and a first output, a beam splitter in an optical path between the first optical equalizer and first and second mirrors, and also configuring the beam splitter in an optical path between the first and second mirrors and a second optical equalizer with half depth that provides a second output.

BRIEF DESCRIPTION OF DRAWINGS

These and other advantages of the invention will be apparent to those of ordinary skill in the art by reference to the following detailed description and the accompanying drawings, where like elements are like numbered when appearing in more than one drawing figure.

DETAILED DESCRIPTION

The application employs a passive optical filter with a designed passband that has a dip in the channel center to achieve a raised-cosine filtering profile in the overall transmission path to achieve inter-symbol interference ISI suppression. The invention integrates the optical equalizing element with an existing component in the transmission path, i.e., the optical interleaver, to realize a monolithic device with the same intra-channel equalization capability.

Figure 1:
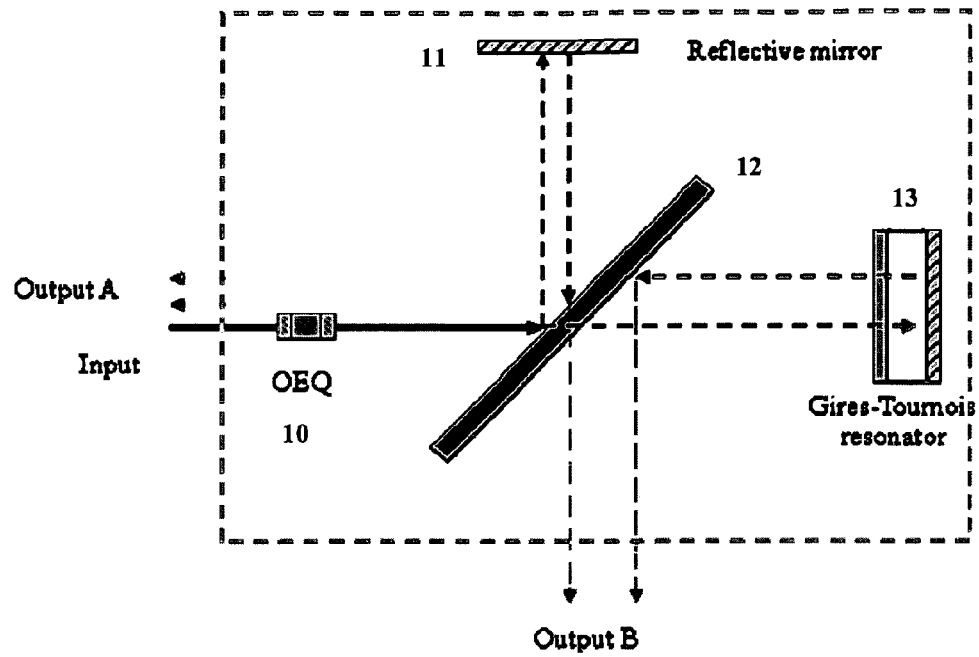
FIG. 1 is a schematic block diagram of an intra-channel equalizing optical interleaver in accordance with the invention.

Referring to the block diagram of FIG. 1, showing an integrated optical interleaver with an integrated optical equalizer. The optical interleaver element is constructed using interferometer principle. The optical interleaver part is based on a Michelson interferometer (MI) configuration that uses a polarization insensitive 50:50 beam splitter 12 to separate the input light into two paths. These two paths have equal path length. One path has a 100% reflective mirror 11 to reflect the light back to the beam splitter, while the other path has a Gires-Tournois resonator (GTR) 13 as the reflector. The input surface of the GTR has low reflectivity while the other surface is 100% reflective. Due to multiple-beam interference within the resonator, the GTR reflects the input light completely but induces a nonlinear phase shift depends strongly on the wavelength of the light. The complex amplitude reflectivity of the GTR can be expressed as:

$$R = \frac{r_i - e^{-i\delta}}{1 - r_i e^{-i\delta}}$$

where $$\delta = \frac{2\pi}{\lambda} nd \cos\theta_t$$

and $r_i$ is the complex amplitude reflectivity of the input surface, n is the refractive index the media, d is the length of the resonating cavity (thickness of the plate), $\theta_t$ is the angle of refraction the light makes within the plate (0 for normally incident light as in this case), and $\lambda$ is the wavelength of the light. The phase shift of the GTR is periodic with period $v_c$.

The beams reflected by the mirror and the GRT respectively interfere at the beam splitter and form two output beams A and B. These beams have complementary interleaved spectra. The normalized output optical power of the interleaver is given by:

$$P = \cos^2\left[\frac{(\phi_L - \phi_c)}{2}\right]$$

where $$\phi_L = \pi \frac{v}{v_c}$$

$$\phi_c = 2\tan^{-1}\left[\alpha\tan\left(\pi\frac{v}{v_c}\right)\right]$$

$$GD = \frac{1}{4\pi}\frac{d\phi_c}{dv}$$

$$\alpha = \frac{1-r}{1+r}$$

$$r = \sqrt{R}$$

The free spectral range (FSR) and passband profile of the interleaver is determined by the reflectivity of the input surface of the GTR.

The optical equalizer 10 is inserted in the optical path of the input before the beam splitter 12. Essentially the target of the equalizer 10 is to design a filtering element that compensates the filtering effects from passive optical components in the transmission path (such as multiplexer, demultiplexer and interleaver) to obtain an overall raised-cosine transmission curve at the output, because the signals whose Fourier transforms follow raised-cosine profile satisfy the Nyquist criteria and thus will not suffer from ISI with proper settings of sampling time. Since the accumulated filtering effect caused by these passive optical components in the transmission link usually has Gaussian shape, optical filter with periodic dips at the center of the DWDM channels is used as the OEQ 10.

Such equalizer can be constructed with different methods such as Mach-Zehnder interferometer, Fabry-Perot (FP) interferometer, fiber Bragg grating and optical loop mirror. In our implementation, FP interferometer is used.

Figure 2:
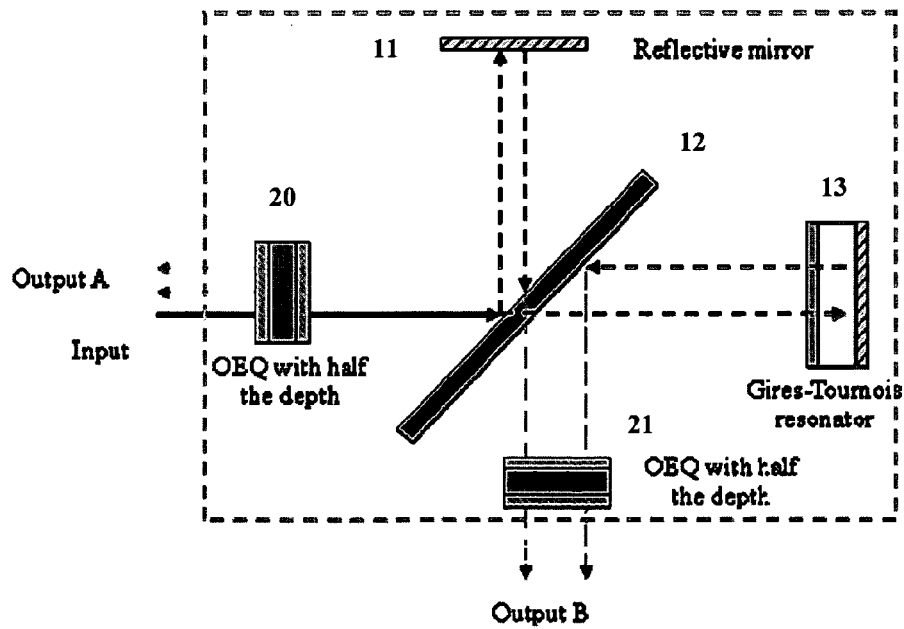
FIG. 2 is an exemplary embodiment of an implementation of an intra-channel equalizing optical interleaver in accordance with the invention.

There are several possible structures to integrate the interleaver element and the equalizer element together. A practical implementation of the inventive intra-channel equalizing optical filter is shown in FIG. 2. The structure of having one equalizer with half the depth of the required ripple dips at each output port is selected because it does not have dual collimator issue or receiving signal balance issue. The downside is that it requires two equalizing elements 20, 21 physically. Since these two elements are designed for standard ITU-T DWDM channel grid, their free spectral range and center frequency align with each other.

Figure 3:
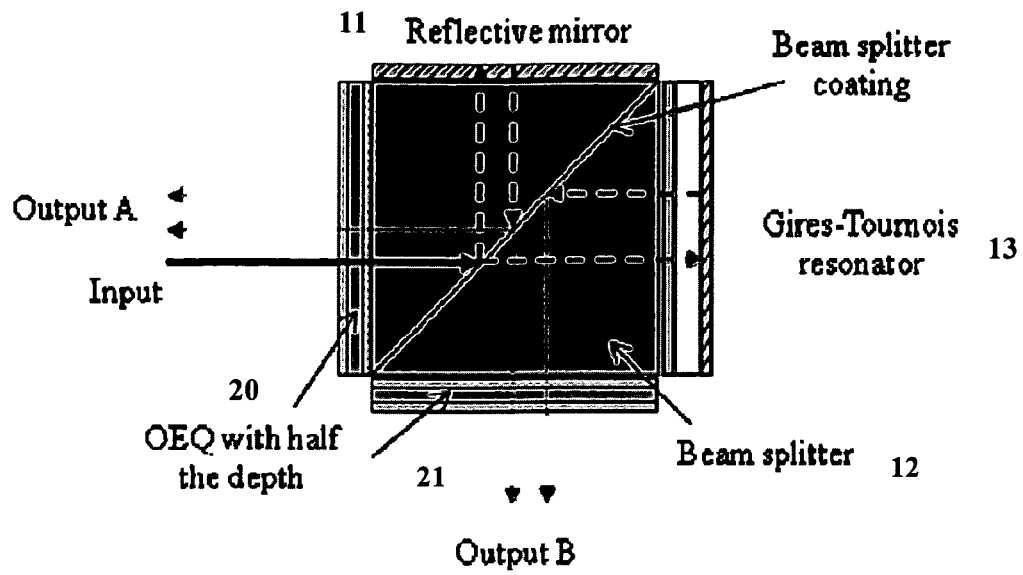
FIG. 3 is a schematic diagram of a bulk device implementation of the intra-channel equalizing optical interleaver shown in FIG. 2.

There are different technologies/platforms to implement the inventive device. An inventive embodiment based on bulk optic technology is shown in FIG. 3. Bulk optic technology is used to construct the Ml interferometer. A beam splitter 12 with beam splitting coating is the core of the device. On the input surface and the output surface (left and bottom surface on the diagram), FP etalons are added using the dielectric thin-film coating technology to form the equalizers 20, 21. Mirror coating is applied on the first reflective surface (top surface) 11. GTR is added to the other reflective surface (right surface) 13, also using dielectric thin-film coating technology. Dual fiber collimator is used at the input surface for both the input beam Input and first output beam Output A, while single fiber collimator is used for the second output beam Output B.

Figure 4:
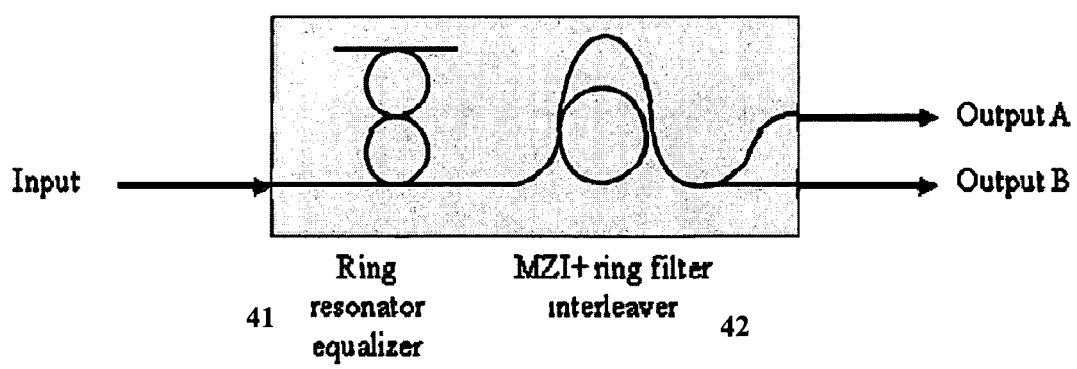
FIG. 4 is a schematic diagram of a photonic lightwave circuit (PLC) embodiment of the intra-channel equalizing optical interleaver in accordance with the invention.

An alternative device embodiment of the invention based on photonic lightwave technology is shown in FIG. 4. Two PLC-based elements 41, 42 are placed in series, one (the ring resonator) for the equalizing function, and the other one (MZI+ring resonator) for interleaving function. No exact parameter or detailed design is provided. However it's known that PLC technology can be used to build these 2 elements, so it's obvious that they can be connected within a single device to achieve the equalizing interleaver function. A fiber based embodiment of the invention is more straightforward, but the saving on the size, insertion loss and cost is not significant.

Figure 5:
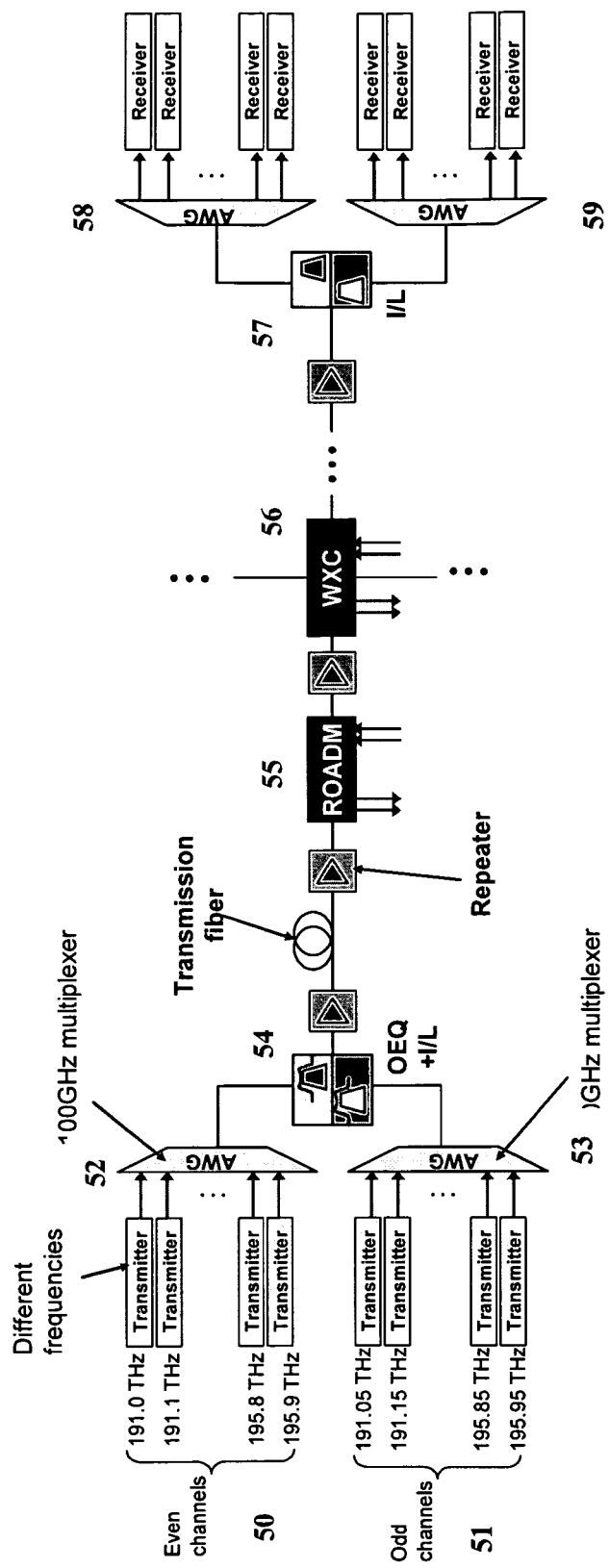
FIG. 5 is a block diagram of an exemplary DWDM communications configuration for illustrating an application of the inventive intra-channel equalizing optical interleaver.

An exemplary application of the inventive intra-channel equalizing optical interval is shown in a DWDM communication system, see FIG. 5, to highlight the benefit of the invention.

The optical DWDM communication system transmits multiple optical channels at different wavelengths (or frequencies) over the same fiber. In this illustration, 50 channels are transmitted with 100 GHz channel spacing (from 191.0 THz to 195.9 THz), they are combined using an arrayed waveguide grating (AWG) multiplexer with 100 GHz spacing (the upper one) 52. These channels are called Even Channels 50.

When the system is upgraded to double the channel count and transmission capacity, another set of DWDM channels with 100 GHz spacing are added 51. This set of channels have 50 GHz offset from the first set (e.g. from 191.15 THz to 195.95 THz). These are the Odd Channels and are combined using another 100 GHz-spaced AWG multiplexer (the lower one, which has 50 GHz offset from the upper one too) 53.

The signals from the two AWG multiplexers are combined using an 100 GHz/50 GHz equalizing optical interleaver 54 according to the invention and then transmitted. This signal now is 50 GHz-spaced.

In the transmission link there are elements such as optical repeater (basically consists of optical amplifiers and maybe optical dispersion compensation element), transmission fiber, reconfigurable optical add/drop multiplexer (ROADM, which add or drop part or all DWDM channels) 55, wavelength cross-connect, (WXC, which not only adds or drops DWDM channels, but can also cross part or all channels with other optical paths for nodes with more than 2 degree, i.e. more than just one input and one output) 56.

At the receiving end, the 50 GHz-spaced signal is separated back to Odd and Even sets using a 50 GHz/100 GHz optical de-interleaver 57, and then separated into individual channels using two AWG demultiplexers 58, 59 respectively.

The invention adds intra-channel equalizing function into the optical interleaver and/or the de-interleaver. Within the entire transmission link between optical transmitter and receiver, several passive optical devices (such as the AWG multiplexer and demultiplexer, interleaver and de-interleaver, and filtering elements in the ROADM and WXC (such as the wavelength blocker or wavelength selective switch)) will impose filtering effect on the DWDM signal, which leads to inter-symbol interference. The intra-channel equalizing function of the invented device reverses the filtering effect within each channel (the so called optical equalization) and thus mitigates the ISI effect to achieve better transmission quality.

The diagram in FIG. 5 placed the equalizing element with the optical interleaver 54 at the transmission end. It can also be placed with the de-interleaver at the receiving end 57, or at both.

It is noted that FIG. 5 accompanying this application is for illustration purposes only. For example, instead of 100 G/50 G system, the same concept can be applied to combining two 50 GHz-spaced DWDM systems into one 25 GHz-spaced system; and the channel frequency does not need to be from 191.0 THz to 195.95 THz).

In summary, the inventive intra-channel optical equalizing interleaver suppresses inter-symbol interference ISI caused by the filtering effect to improve the transmission performance of a DWDM signal. Compared to known techniques, the inventive solution has less loss, a smaller footprint, lower cost, less complex, easily achievable and can work with any modulation. It is 1 monolithic device combing 2 functions: optical interleaver and intra-channel optical equalizer. Therefore it not only combines 2 inputs into one with double the spectral density (e.g. 100 GHz channel spacing becomes 50 GHz channel spacing), it also improves the signal quality (reducing the ISI) through providing equalization within the channel.

The inventive solution is a passive device and can be used in the reverse direction, so it will be an "intra-channel equalizing optical de-interleaver" for the receiver end. Instead of combing 2 inputs, it separates the input DWDM signal to 2 that have half the spectral density, and still performs the intra-channel equalization. In contrast to a regular interleaver, the inventive solution provides intra-channel equalization to mitigate ISI. Compared to a standalone equalizer the invention provides an interleaving or de-interleaving function too. Compared to having 2 separate devices, an regular interleaver and a separate equalizer, the inventive integrated interleaver and equalizer has smaller size, lower optical loss, better tolerance to environment change, and lower cost.

The present invention has been shown and described in what is considered to be the most practical and preferred embodiment. It is anticipated, however, that departures may be made therefrom and that obvious modifications will be implemented by those skilled in the art. It will be appreciated that those skilled in the art will be able to devise numerous arrangements and variations which, not explicitly shown or described herein, embody the principles of the invention and are within their spirit and scope.

What is claimed is:

1. An apparatus comprising:
   an interleaver configuration for at least one of combining and separating odd and even channel groups to achieve channel density doubling; and
   an optical equalizer for suppressing inter symbol interference within the channels to provide intra-channel equalizing in the optical path, the equalizer being integrated into the optical path the interleaver to realize a monolithic device and comprising a first equalizer with half the depth of required ripple dips at both a first output port and an input port and a second equalizer with half the depth of required ripple dips at a second output port.

2. The apparatus of claim 1, wherein the optical equalizer comprises a passband that has a dip in the channel center to achieve a raised-cosine filtering profile in the optical signal path to achieve inter-symbol interference ISI suppression.

3. The apparatus of claim 1, wherein the optical equalizer comprises a photonic lightwave circuit based ring resonator equalizer.

4. The apparatus of claim 1, wherein the optical interleaver comprises a photonic lightwave circuit based Mach-Zender interferometer and ring filter interleaver.

5. The apparatus of claim 1, wherein the optical equalizer comprises a Fabry-Perot etalon-based optical equalizer.

6. The apparatus of claim 1, wherein the interleaver and equalizer are integrated as a single device employing bulk optic structure.

7. A method comprising the steps of:
   combining or separating odd and even channel groups to achieve channel density doubling;
   suppressing inter-symbol interference within the channels in the optical path to provide intra-channel equalizing, and
   integrating the combining or separating odd and even channel groups and suppressing of inter-symbol interfere into a single device,
   wherein the integrating step comprises combining the steps of providing and suppressing with bulk optic device structure and configuring a first optical equalizer with half depth in an optical path of an input and a first output, a beam splitter in an optical path between the first optical equalizer and first and second mirrors, and also configuring the beam splitter in an optical path between the first and second mirrors and a second optical equalizer with half depth that provides a second output.

8. The method of claim 7, wherein the integrating comprises a single monolithic device.

9. The method of claim 7, wherein the suppressing comprises a passband that has a dip in the channel center to achieve a raised-cosine filtering profile in the optical signal path to achieve inter-symbol interference ISI suppression.

10. An apparatus comprising:

an interleaver configuration for at least one of combining and separating odd and even channel groups to achieve channel density doubling; and an optical equalizer for suppressing inter symbol interference within the channels to provide intra-channel equalizing in the optical path, the equalizer being integrated into the interleaver, said interleaver and equalizer being integrated together in the form of a bulk optic device comprising a first optical equalizer with half depth in an optical path of an input and a first output, a beam splitter in an optical path between the first optical equalizer and first and second mirrors, the beam splitter also being in an optical path between the first and second mirrors and a second optical equalizer with half depth that provides a second output.

* * * * *